United States Patent
Barthel et al.

(10) Patent No.: US 7,284,152 B1
(45) Date of Patent: Oct. 16, 2007

(54) REDUNDANCY-BASED ELECTRONIC DEVICE HAVING CERTIFIED AND NON-CERTIFIED CHANNELS

(75) Inventors: Herbert Barthel, Herzogenaurach (DE); Hartmut Von Krosigk, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/380,146

(22) PCT Filed: Feb. 13, 1998

(86) PCT No.: PCT/EP98/00827

§ 371 (c)(1),
(2), (4) Date: Jun. 3, 2005

(87) PCT Pub. No.: WO98/38577

PCT Pub. Date: Sep. 3, 1998

(30) Foreign Application Priority Data

Feb. 26, 1997 (EP) .................................. 97103151

(51) Int. Cl.
*G06F 11/00* (2006.01)
(52) U.S. Cl. ........................................................ 714/12
(58) Field of Classification Search .................. 714/12
See application file for complete search history.

(56) References Cited

U.S. PATENT DOCUMENTS

| | | | | |
|---|---|---|---|---|
| 4,245,342 A | * | 1/1981 | Entenman .............. 340/825.01 |
| 5,136,704 A | * | 8/1992 | Danielsen et al. ............. 714/11 |
| 5,499,336 A | * | 3/1996 | Preis et al. ..................... 714/4 |
| 5,560,033 A | * | 9/1996 | Doherty et al. ............. 713/340 |
| 5,638,510 A | * | 6/1997 | Ishikawa ...................... 714/51 |
| 5,684,947 A | * | 11/1997 | Horie ......................... 714/37 |
| 5,784,547 A | * | 7/1998 | Dittmar et al. ................ 714/4 |
| 5,838,899 A | * | 11/1998 | Leavitt et al. ............... 714/56 |
| 5,898,829 A | * | 4/1999 | Morikawa ..................... 714/47 |
| 6,079,017 A | * | 6/2000 | Han et al. ....................... 713/2 |
| 6,105,087 A | * | 8/2000 | Rivoir ........................ 710/100 |
| 6,425,093 B1 | * | 7/2002 | Singh et al. .................. 714/38 |
| 6,466,539 B1 | * | 10/2002 | Kramer et al. ............. 370/216 |
| 7,174,483 B2 | * | 2/2007 | Becher et al. ................ 714/55 |

FOREIGN PATENT DOCUMENTS

DE         37 18 582         12/1987

(Continued)

OTHER PUBLICATIONS

Zender, P., "Sicherheitsgerichtete SPS In Anlagen mit Gefahrdungspotential (Safety Related PLC in Plants with Hazard Potential)," Automatisierungstechnische Praxis—ATP, Bd. 36, Nr. 12, Dec. 1, 1994, pp. 27-34.

(Continued)

*Primary Examiner*—Bryce P Bonzo
(74) *Attorney, Agent, or Firm*—Staas & Halsey LLP

(57) ABSTRACT

An at least dual-channel homogeneous-redundancy-based electronic device, preferably a dual-channel homogeneous-redundancy-based central processing unit of a stored-program control, that has at least one certified channel and at least one non-certified channel. The at least one, and certified channel is a channel that is sufficiently free of systematic errors. Components that have not been proven sufficiently free of systematic errors can be used in the at least one non-certified channel.

8 Claims, 1 Drawing Sheet

FOREIGN PATENT DOCUMENTS

DE    195 04 404    6/1996
EP    0 742 507    11/1996

OTHER PUBLICATIONS

Verma, M. R. et al., "The Design and Development of a Fail Safe Interlocking System Microprocessors for Indian Railways, Information Technologies for the Nineties—E2C2"; Energy, Electroni Computers Communications, Bombay, Nov. 22, 1989, Conf. Nr. 4, IEEE, pp. 511-514.

"Card Functional Self-Test Diagnostic Method," IBM Technical Disclosure Bulletin, Bd. 32, Nor. 3A, Aug. 1989, pp. 401-402.

* cited by examiner

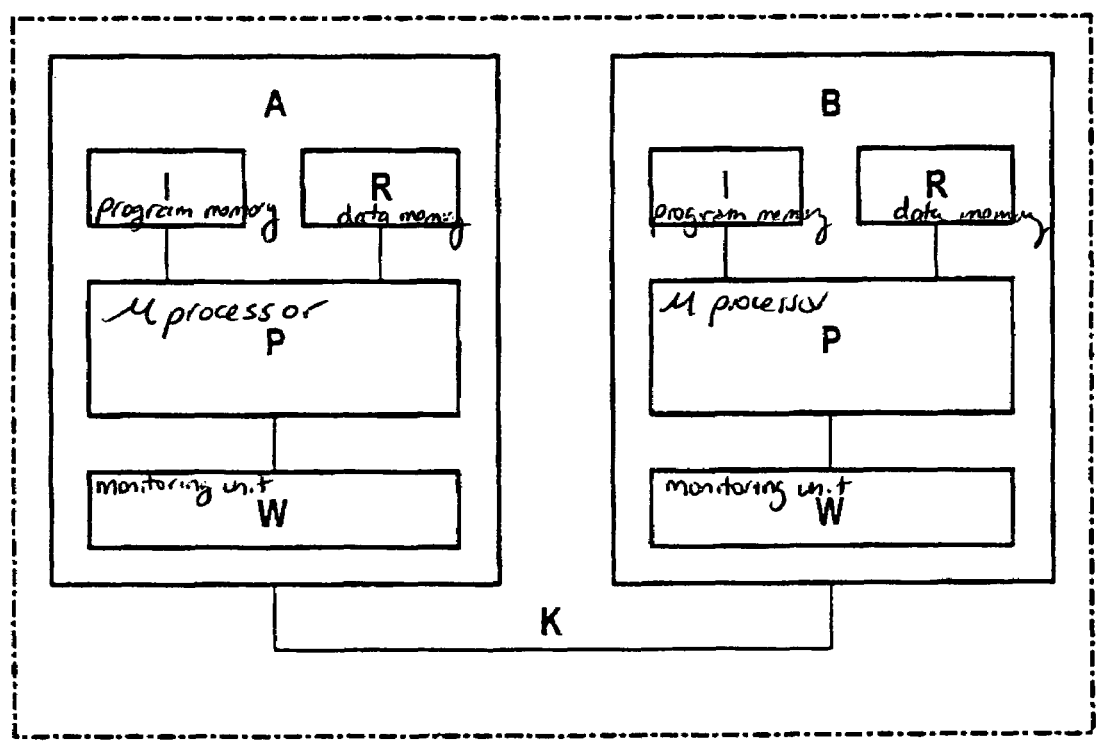

REDUNDANCY-BASED ELECTRONIC DEVICE HAVING CERTIFIED AND NON-CERTIFIED CHANNELS

FIELD OF THE INVENTION

The present invention relates to an electronic device that has at least two channels. The electronic device is preferably a dual-channel programmable logic circuit capable of being a the central processing unit of a stored-program control.

BACKGROUND INFORMATION

Electronic devices for safety-related tasks require a high level of functional safety, with the term "functionally safe" referring to the term "functional safety as" used in the international publication Draft-IEC 1508.

A key feature of functionally safe electronic devices is that they include special means for avoiding, detecting and handling errors and malfunctions.

A common way to avoid, detect and handle errors and malfunctions is to design multi-channel redundancy-based electronic devices, in which the same operations are carried out in parallel in all the channels. Results and output values are compared to determine whether an error has occurred in one of the channels.

One particular group of errors that is particularly significant, if one is striving to guarantee functionally safe operation, is systematic errors in modules, units or components of channels. Errors of this kind may be caused, for example, by the logic structure, i.e., the way the individual components and modules are interconnected, or by their physical characteristics, which are governed by the manufacturing process used. Extensive certification is required to prove that the application in question is sufficiently free of systematic errors.

Semiconductor technology changes very rapidly nowadays, and manufacturing processes are modified after very short periods of time. As a result, one often has to take repeated action to prove that the components and units in question are free of systematic errors because components and units of this kind must be subjected to extensive certification before they can be used in systems rated functionally safe.

As a result of the rapid innovation cycle in the semiconductor industry, this certification has to be carried out afresh for each new generation of microprocessor or memory chip, for example, with the certification process taking considerable time. Tests must be performed and/or it has to be proven that the component in question functions properly resulting in a considerable delay before new types of components can be used in safety-related applications.

SUMMARY OF THE INVENTION

An object of the present invention is to produce an electronic device that allows the use of modules, units or components not yet proven sufficiently free of systematic errors in safety-related systems that has homogeneously redundant channels.

This object is achieved for the electronic device according to the present invention in that the at least dual-channel homogeneous-redundancy-based electronic device, which preferably may be a dual-channel homogeneous-redundancy-based programmable logic circuit, has at least one certified channel and at least one non-certified channel, and the certified channel is a channel that is sufficiently free of systematic errors.

Here a "channel sufficiently free of systematic errors" is a channel for which, over a specific period of time, the probability of failure does not exceed a specific level as determined by the application in question, e.g. a level as defined in the international publication Draft-IEC 1508.

If a queriable signal, e.g. a special memory cell or a mechanical or electronic switch, is provided for each channel, and when the signal is queried a first flag denoting a certified channel or a second flag denoting a non-certified channel is detectable, and the electronic device only starts to operate if the first flag is detected at least once when the flags of the individual channels are queried, this constitutes a self-test of the electronic device that ensures that the electronic device only starts to operate if it is guaranteed that at least one of the channels of the at least dual-channel electronic device is a channel sufficiently free of systematic errors, i.e. a certified channel.

If the querying of flags of the individual channels is carried out in sequence, it can be unambiguously determined which of the channels is a channel sufficiently free of systematic errors, i.e. a certified channel, and which of the channels is a channel insufficiently free of systematic errors, i.e. a non-certified channel.

When the electronic device is in operation, if, after a preassignable period of time during which no errors are detected, the flag of the non-certified channel can be switched over from the second flag denoting that the channel is non-certified to the first flag denoting that the channel is certified. This channel can itself be used as the reference channel after a sufficiently long period of operation and evaluation of the operating behavior of the hitherto non-certified channel. Thus, the electronic device allows use of, for example, units, components or modules of the next generation, which have not been certified, without any need to prove in advance that they are free of errors.

Further advantages and inventive elements are explained below in the description of an exemplary embodiment, with the help of the drawing and in conjunction with the dependent claims.

BRIEF DESCRIPTION OF THE DRAWINGS

FIG. 1 illustrates a block diagram of a dual-channel homogeneous-redundancy-based central processing unit of a stored-program control according to the present invention.

DETAILED DESCRIPTION

According to FIG. 1, the electronic device EG is a dual-channel homogeneous-redundancy-based central processing unit of a stored-program control. Here, "homogeneous redundancy" means that the individual channels are symmetrical and have at least functionally equivalent units, components or modules. In the exemplary embodiment shown in FIG. 1, channel A has a microprocessor P, a program memory I and a data memory R. A monitoring unit W, a watchdog, monitors operation of microprocessor P. Channel B is homogeneously redundant with respect to channel A, which is apparent from the fact that the same components P, I and R are given the same reference letters.

Channel A must include components P, I, R and W that have been proven sufficiently free of systematic errors, meaning that the components, units and modules are certified. Thus, channel A as a whole constitutes channel A that is sufficiently free of systematic errors.

In channel B, one or a plurality of components P, I, R, and W, which have been modified in some way, i.e. due to a new or modified manufacturing process, and have not been proven sufficiently free of systematic errors, are used.

If any systematic errors present in the relevant units, components or modules of channel B occur, they are detected when the results of channel B are compared with those of channel A. This comparison can be carried out by coupling K located between channels A and B. Thus, the systematic errors can be handled appropriately.

It is thus possible to use units, components or modules not yet proven sufficiently free of errors, and therefore not yet certified, in a channel A, B in redundancy-based electronic device EG without impairing its safety characteristics. Systematic errors caused by, for example, the physical characteristics of the electronic units, components or modules in question, or by modifications to the manufacturing or assembly process, can be detected via the comparison of results.

Electronic device EG according to the present invention allows the manufacturer of such a device to react immediately to innovation cycles, for example in the semiconductor industry, and also, in functionally safe systems. As a result, the manufacturer may always offer units, components or modules that correspond to the current state of development, even if these units have not yet been certified and explicitly proven sufficiently free of systematic errors.

It is also especially advantageous in this context that this certification can be achieved implicitly via the method and electronic device EG according to the present invention.

To this end, a flag denoting whether channel A, B in question can be considered sufficiently free of systematic errors is provided for each channel A, B of electronic device EG. After a specific period of time preferably freely assignable by the user, during which no systematic errors have been detected in the hitherto non-certified channel A, B during operation of electronic device EG, this flag can be switched over from 'non-certified' to 'certified,' so that the hitherto not explicitly certified channel, which has been shown to be sufficiently free of systematic errors during actual operation, can also be used like an explicitly certified channel.

This allows one, preferably in an electronic device EG, to also use, along with what is now an "online-certified" channel, units, modules or components of the next semiconductor component generation, a further redundant channel A, B and the method described above to prove that these components too are sufficiently free of systematic errors.

Thus electronic device EG and the process according to the present invention allows the use of cutting-edge units, modules or components, which would otherwise only be authorized after a lengthy certification process concerning use in safety-related systems.

What is claimed is:

1. An at least dual-channel homogeneous-redundancy-based electronic device, comprising:

at least one certified channel; and at least one non-certified channel sufficiently free of systematic errors, a queriable signal provided for each of the at least one certified channel and the at least one non-certified channel, one of a first flag and a second flag being detectable when the signal is queried, the first flag denoting a certified channel, the second flag denoting a non-certified channel, the electronic device operating only if the first flag is detected at least once.

2. The electronic device according to claim 1, wherein the electronic device includes a dual-channel homogenous redundancy based programmable logic circuit.

3. The electronic device according to claim 1, wherein flags corresponding to each of the at least one certified channel and the at least one non-certified channel are queried, via the signal, in a sequence.

4. The device according to claim 1, wherein the flag of the at least one non-certified channel is changed from the second flag to the first flag after a predefined period of time, the predefined period of time being error-free.

5. A method for operating an at least dual-channel homogeneous-redundancy-based electronic device, comprising the steps of:

querying a signal corresponding to each of at least one certified channel and at least one non-certified channel, the at least one certified channel being sufficiently free of systematic errors;

detecting one of a first flag and a second flag via the signal, the first flag denoting a certified channel, the second flag denoting a non-certified channel; and starting the electronic device only after detecting the first flag at least once.

6. The method according to claim 5, wherein the electronic device includes a dual-channel homogenous redundancy based programmable logic circuit.

7. The method according to claim 6, wherein the step of querying further comprises the step of:

querying flags corresponding to the at least one certified channel and the at least one non-certified channel via the signal, in a sequence.

8. The method according to claim 6, further comprising the step of:

changing the flag of the at least one non-certified channel from the second flag to the first flag after a predefined period of time, the predefined period of time being error-free.

* * * * *